US010649564B2

(12) United States Patent
Li et al.

(10) Patent No.: US 10,649,564 B2
(45) Date of Patent: May 12, 2020

(54) TOUCH DISPLAY PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventors: Jinyu Li, Beijing (CN); Yue Li, Beijing (CN); Yanchen Li, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/761,707

(22) PCT Filed: Jul. 28, 2017

(86) PCT No.: PCT/CN2017/094870
§ 371 (c)(1),
(2) Date: Mar. 20, 2018

(87) PCT Pub. No.: WO2018/126658
PCT Pub. Date: Jul. 12, 2018

(65) Prior Publication Data
US 2019/0056830 A1    Feb. 21, 2019

(30) Foreign Application Priority Data
Jan. 3, 2017  (CN) .......................... 2017 1 0002677

(51) Int. Cl.
*G06F 3/041*    (2006.01)
*G02F 1/1333*    (2006.01)
(Continued)

(52) U.S. Cl.
CPC ........ *G06F 3/0412* (2013.01); *G02F 1/13338* (2013.01); *G02F 1/13458* (2013.01); *G06F 3/0416* (2013.01); *G06F 3/044* (2013.01)

(58) Field of Classification Search
CPC ............. G02F 1/13338; G02F 1/13452; G02F 1/136286; G06F 3/0412; G06F 3/0416; G06F 3/044
See application file for complete search history.

(56) References Cited

U.S. PATENT DOCUMENTS

2011/0169759 A1    7/2011  Wang et al.
2014/0092117 A1*   4/2014  Yoshimura ............... G09G 5/02
                                                      345/589
(Continued)

FOREIGN PATENT DOCUMENTS

CN         103076937 A     5/2013
CN         204009826 U    12/2014
(Continued)

OTHER PUBLICATIONS

Nov. 2, 2017—(WO) International Search Report and Written Opinion Appn PCT/CN2017/094870 with English Translation.
(Continued)

*Primary Examiner* — Nelson M Rosario
(74) *Attorney, Agent, or Firm* — Banner & Witcoff, Ltd.

(57) ABSTRACT

A touch display panel and a display device are disclosed. The touch display panel includes a plurality of touch signal lines and a plurality of data lines disposed in a display area, and a plurality of lead terminals disposed in a peripheral area. The plurality of lead terminals includes a plurality of first terminals respectively connected to the plurality of data lines and a plurality of second terminals respectively connected to the plurality of touch signal lines. The plurality of lead terminals are arranged in a matrix. The first terminals and the second terminals are provided in a row direction or
(Continued)

a column direction so as to be consistent with the sequence in which the data lines connected to the first terminals and the touch signal lines connected to the second terminals are arranged.

8 Claims, 7 Drawing Sheets

(51) Int. Cl.
*G02F 1/1345* (2006.01)
*G06F 3/044* (2006.01)

(56) References Cited

U.S. PATENT DOCUMENTS

| | | |
|---|---|---|
| 2015/0261367 A1 | 9/2015 | Zhang et al. |
| 2016/0048240 A1 | 2/2016 | Wang et al. |
| 2016/0370919 A1 | 12/2016 | Xu et al. |
| 2017/0192575 A1 | 7/2017 | Jin |
| 2017/0322650 A1 | 11/2017 | Liu et al. |
| 2018/0005560 A1* | 1/2018 | Itakura ............... G09G 3/20 |
| 2018/0059855 A1* | 3/2018 | Gwon ............... G06F 3/0412 |
| 2018/0188584 A1 | 7/2018 | Yeh |

FOREIGN PATENT DOCUMENTS

| | | |
|---|---|---|
| CN | 105094422 A | 11/2015 |
| CN | 204795859 U | 11/2015 |
| CN | 103076937 B | 4/2016 |
| CN | 106325608 A | 1/2017 |
| CN | 106598346 A | 4/2017 |
| CN | 206178744 U | 5/2017 |
| CN | 108255353 A | 7/2018 |
| KR | 20110071681 A | 6/2011 |

OTHER PUBLICATIONS

Feb. 3, 2019—(CN) First Office Action Appn 201710002677.2 with English Translation.
Mar. 1, 2019—(AU) First Office Action Appn 2017332966.
Jul. 17, 2019—(KR) First Office Action Appn 2018-7008658 with English Translation.

* cited by examiner

TOUCH DISPLAY PANEL AND DISPLAY DEVICE

CROSS REFERENCE OF RELATED APPLICATIONS

The application is a U.S. National Phase Entry of International Application No. PCT/CN2017/094870 filed on Jul. 28, 2017, designating the United States of America and claiming priority to Chinese Patent Application No. 201710002677.2, filed Jan. 3, 2017. The present application claims priority to and the benefit of the above-identified applications and the above-identified applications are incorporated by reference herein in their entirety.

TECHNICAL FIELD

The present disclosure relates to the technical field of display, and in particular, to a touch display panel and a display device.

BACKGROUND

With the trend of reduced thickness and light weight of touch panels, the research of integrating a touch panel and a liquid crystal display substrate into a touch display panel has become more and more popular. The in-cell touch technical solution which the function of a touch panel is embedded into a liquid crystal display substrate has obtained extensive attention. At present, the solution of realizing the self-capacitance in-cell touch panel segments a transparent electrode layer used as a common electrode of a display substrate into a plurality of electrode squares as touch electrodes, and connecting one end of a touch signal line to a touch electrode, and connecting the other end of the touch signal line to a touch driving chip, in order to achieve the transmission of touch signals and to further determine the position of a touch operation. Specifically, the fluctuation of the capacitance value of the touch electrode at the corresponding position may be caused when a finger touches the display panel. The touch driving chip can determine the position of the touch point by detecting the fluctuation of the capacitance value so as to realize the touch function.

SUMMARY

Embodiments of the present disclosure provide a touch display panel and a display device for simplifying the design of wirings for connecting a touch driving chip to data lines and touch signal lines in the touch display panel, thereby simplifying the manufacturing process for the touch display panel and reducing production cost.

According to a first aspect of the present disclosure, a touch display panel is provided. The touch display panel comprises a plurality of touch signal lines and a plurality of data lines disposed in a display area, and a plurality of lead terminals disposed in a peripheral area. The plurality of lead terminals comprises a plurality of first terminals respectively connected to the plurality of data lines and a plurality of second terminals respectively connected to the plurality of touch signal lines. The plurality of lead terminals are arranged in a matrix. The first terminals and the second terminals are provided in a row direction or a column direction so as to be consistent with a sequence in which the data lines connected to the first terminals and the touch signal lines connected to the second terminals are arranged.

In a possible implementation manner, in the above touch display panel provided by an embodiment of the present disclosure, two adjacent rows of the lead terminals shift from each other by a predetermined distance in the row direction.

In a possible implementation manner, the predetermined distance is a half of a width of each of the lead terminals.

In a possible implementation manner, in the above touch display panel provided by an embodiment of the present disclosure, the display area comprises a plurality of columns of pixels, and one touch signal line is disposed in every two columns of pixels.

In a possible implementation manner, in the above touch display panel provided by an embodiment of the present disclosure, the display area comprises a plurality of columns of pixels, and one touch signal line is disposed for each column of pixels.

In a possible implementation manner, in the above touch display panel provided by an embodiment of the present disclosure, the pixels comprise red sub-pixels, green sub-pixels and blue sub-pixels, and the touch signal lines are disposed between the red sub-pixels and the green sub-pixels.

In a possible implementation manner, in the above touch display panel provided by an embodiment of the present disclosure, the data lines and the touch signal lines are provided in a same layer and insulated from each other.

According to a second aspect of the present disclosure, a display device is provided, and the display device comprises the touch display panel according to any one of the embodiments.

According to the touch display panel and the display device in an embodiment of the present disclosure, the leads corresponding to the data signal lines and the leads corresponding to the touch signal lines can be prepared wirings in a same layer by mixing and arranging the first terminals connected to the data lines and the second terminals connected to the touch signal lines. In this way, there is no need to extra add a metal layer and a corresponding manufacturing process to separately fabricate the leads corresponding to the touch signal lines, thereby reducing manufacturing cost. In addition, it can eliminate the problems of all kinds of bad and the large space occupied by preparing wirings caused by extra adding the metal wirings, so as to improve the production yield.

BRIEF DESCRIPTION OF THE DRAWINGS

In the drawings, the reference numerals with the same last two digits correspond to the same elements. It should be noted that the elements in the drawings are schematic and not drawn with a real scale.

DETAILED DESCRIPTION

Figure 1:
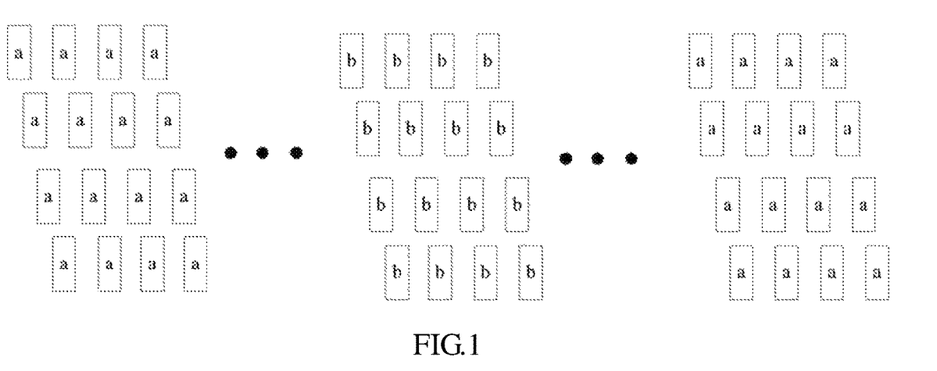
FIG. 1 is a schematic diagram of an exemplary distribution of lead terminals for a touch driving chip in a touch display panel.
Figure 2:
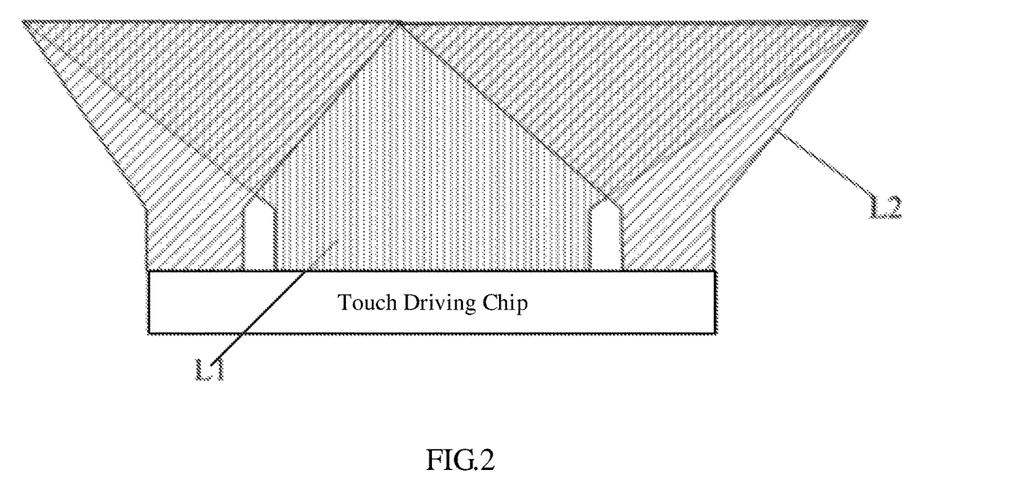
FIG. 2 is a schematic diagram of preparing wirings for the leads when the touch display panel with the distribution of the lead terminals as illustrated in FIG. 1 is connected to the touch driving chip.

A plurality of touch signal lines and a plurality of data lines are provided in a display area of a touch display panel, and a plurality of lead terminals respectively connected to the touch signal lines and the data lines by leads are provided in a peripheral area of the touch display panel. The touch signal lines and the data lines are connected to a touch driving chip via the lead terminals so that the touch driving chip transmits data signals through the data lines and transmits touch signals through the touch signal lines to realize the touch function and the display function of the touch display panel. FIG. 1 is a schematic diagram of an exemplary distribution of lead terminals for a touch driving chip in a touch display panel. In the touch display panel having the distribution configuration of the lead terminals as illustrated in FIG. 1, lead terminals a connecting touch signal lines and lead terminals b connecting data lines are arranged in a zoned manner. FIG. 2 is a schematic diagram of wirings for the leads when the touch display panel with the distribution of the lead terminals as illustrated in FIG. 1 is connected to the touch driving chip (the lead terminals not illustrated). Due to the zoned distribution of the lead terminals, two lead layers are required to respectively dispose the leads L1 corresponding to the data lines and the leads L2 corresponding to the touch signal lines to prevent the leads from crossing. As illustrated in FIG. 2, an additional patterning process is additionally required when the design of FIG. 1 is applied, that is, a layer of metal is required to be added on the basis of the leads L1 corresponding to the data lines to realize the design of wirings of the leads L2 corresponding to the touch signal lines, or the additional amount and space for preparing wirings is required to avoid the intersection of the leads for the data lines and the leads for the touch signal lines. This manner takes up more space for preparing wirings, and is not conducive to simplify the manufacturing process of the touch display panel and reduce production cost.

An embodiment of the present disclosure provides a touch display panel and a display device that can simplify the manufacturing process of the touch display panel and reduce production cost. The touch display panel comprises a plurality of touch signal lines and a plurality of data lines disposed in a display area, and a plurality of lead terminals disposed in a peripheral area. The plurality of lead terminals comprises a plurality of first terminals and a plurality of second terminals. Each of the first terminals is connected to one data line by a lead. Each of the second terminals is connected to one touch signal line by a lead. The plurality of lead terminals are arranged in a matrix. The first terminals and the second terminals are provided in a row direction or a column direction so as to be consistent with a sequence in which the data lines connected to the first terminals and the touch signal lines connected to the second terminals are arranged.

The specific implementation of the touch display panel and the display device provided in embodiments of the present disclosure are described in detail in connection with the drawings.

Figure 3:
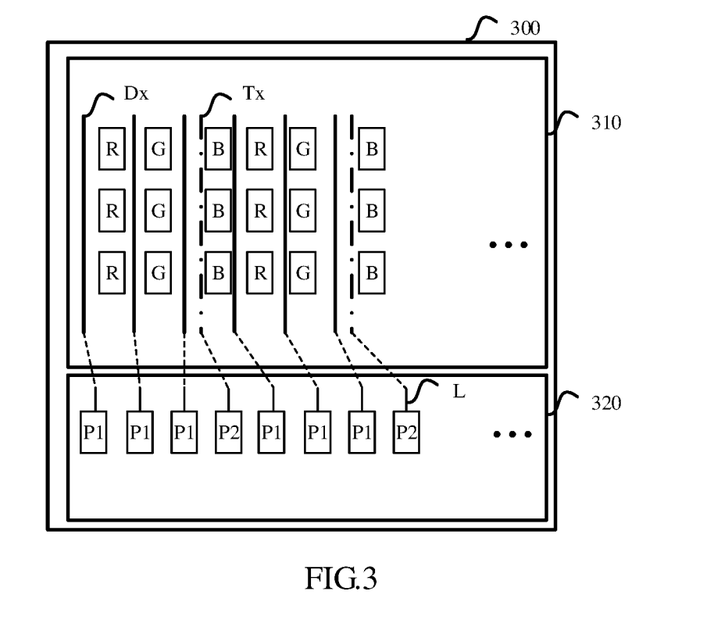
FIG. 3 is a schematic diagram of a touch display panel according to an embodiment of the present disclosure.
Figure 9:
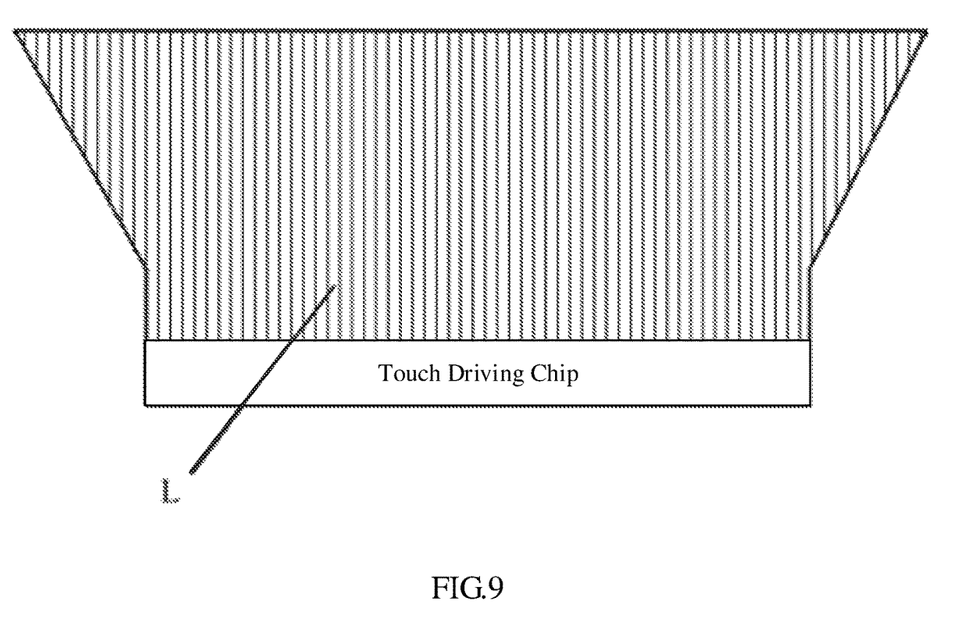
FIG. 9 is a schematic diagram of preparing wirings for the leads when the touch display panel is connected with the touch driving chip according to an embodiment of the present disclosure.

FIG. 3 illustrates a schematic diagram of a touch display panel 300 according to an embodiment of the present disclosure. In the embodiment, the touch display panel 300 comprises: a plurality of touch signal lines Tx and a plurality of data lines Dx disposed in a display area 310, a touch driving chip (not illustrated) disposed in a peripheral area 320, lead terminals disposed in the peripheral area and in one-to-one correspondence to pins of the touch driving chip, and leads L in one-to-one correspondence to the lead terminals. On the touch display panel 300, the lead terminals are arranged in a matrix. The lead terminals comprise first terminals P1 and second terminals P2. Each of the first terminals P1 is connected to one data line Dx through one lead L, and each of the second terminals P2 is connected to one touch signal line Tx through one lead L. The first terminals P1 and the second terminals P2 are provided in one row so as to be consistent with the sequence in which the data lines connected to the first terminals and the touch signal lines connected to the second terminals are arranged. As illustrated in FIG. 3, when the data lines Dx and the touch signal lines Tx are arranged periodically in the sequence of "data line Dx, data line Dx, data line Dx, touch signal line Tx", the first terminals P1 and the second terminals P2 may be periodically arranged in a row with the sequence of "first terminal P1, first terminal P1, first terminal P1, second terminal P2". The leads L corresponding to the data signal lines Dx and the leads L corresponding to the touch signal lines Tx can be prepared and wired in a same layer without intersecting each other by means of such a mixture arrangement of the first terminals P1 corresponding to the data lines Dx and the second terminals P2 corresponding to the touch signal lines Tx (as illustrated in FIG. 9).

Figure 4:
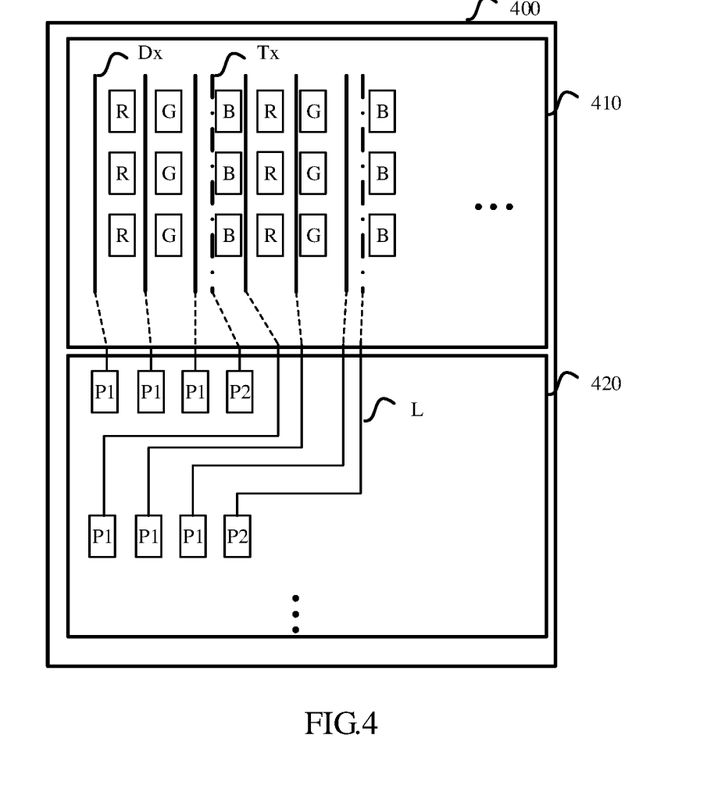
FIG. 4 is a schematic diagram of a touch display panel according to another embodiment of the present disclosure.

FIG. 4 illustrates a schematic diagram of a touch display panel 400 according to another embodiment of the present disclosure. Different from the example as illustrated in FIG. 3, in the example as illustrated in FIG. 4, the first terminals P1 and the second terminals P2 are arranged in a plurality of rows so as to be consistent with the sequence in which the data lines connected to the first terminals and the touch signal lines connected to the second terminals are arranged. When the data lines Dx and the touch signal lines Tx are periodically arranged in the sequence of "data line Dx, data line Dx, data line Dx, touch signal line Tx", correspondingly, the first four lead terminals may be arranged in the first row with the sequence of "first terminal P1, first terminal P1, first terminal P1, second terminal P2" from left to right, and the next four lead terminals may also be arranged in the second row with the sequence of "first terminal P1, first terminal P1, first terminal P1, second terminal P2". It should be understood for those skilled in the art that the remaining lead terminals can be arranged continuously according to the above-described rule although not illustrated in the drawings. It can be seen in FIG. 4 that the leads L corresponding to the data signal lines Dx and the leads L corresponding to the touch signal lines Tx can also be prepared and wired in a same layer without intersecting each other by means of such a mixture arrangement of the first terminals P1 corresponding to the data lines Dx and the second terminals P2 corresponding to the touch signal lines Tx (as illustrated in FIG. 9).

Figure 5:
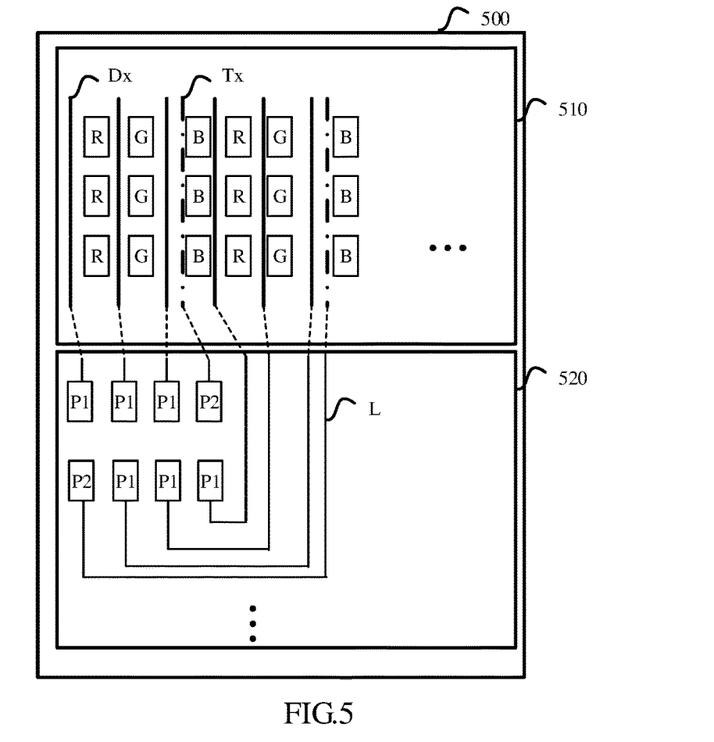
FIG. 5 is a schematic diagram of a touch display panel according to another embodiment of the present disclosure.

FIG. 5 illustrates a schematic diagram of a touch display panel 500 according to another embodiment of the present disclosure. Different from the example as illustrated in FIG.

4, in the example as illustrated in FIG. 5, when the data lines Dx and the touch signal lines Tx are periodically arranged in the sequence of "data line Dx, data line Dx, data line Dx, touch signal line Tx", correspondingly, the first four lead terminals may be arranged in the first row with the sequence of "first terminal P1, first terminal P1, first terminal P1, second terminal P2" from left to right, and the next four lead terminals may also be arranged in the second row with the sequence of "second terminal P2, first terminal P1, first terminal P1, first terminal P1". It should be understood for those skilled in the art that the remaining lead terminals can be arranged continuously according to the above-described rule although not illustrated in the drawings. It can be seen in FIG. 5 that the leads L corresponding to the data signal lines Dx and the leads L of the corresponding touch signal lines Tx can also be prepared and wired in a same layer without intersecting each other by means of such a mixture arrangement of the first terminals P1 corresponding to the data lines Dx and the second terminals P2 corresponding to the touch signal lines Tx (as illustrated in FIG. 9).

Figure 6:
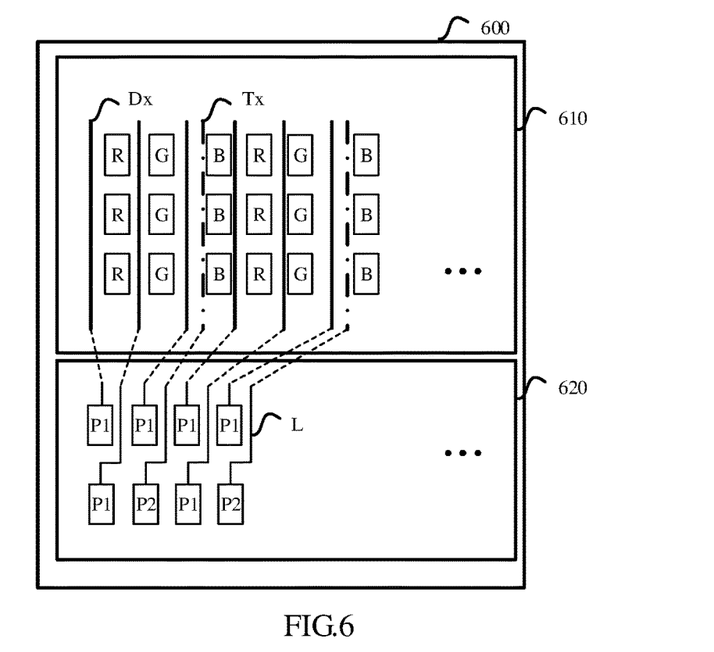
FIG. 6 is a schematic diagram of a touch display panel according to another embodiment of the present disclosure.

FIG. 6 illustrates a schematic diagram of a touch display panel 600 according to another embodiment of the present disclosure. Different from the embodiments as illustrated in FIGS. 3-5, in the example as illustrated in FIG. 6, the first terminals P1 and the second terminals P2 are arranged in a plurality of columns so as to be consistent with the sequence in which the data lines connected to the first terminals and the touch signal lines connected to the second terminals are arranged. When the data lines Dx and the touch signal lines Tx are periodically arranged in the sequence of "data line Dx, data line Dx, data line Dx, touch signal line Tx", correspondingly, in the order from the innermost lead terminal to the outermost lead terminal of each column, the first two lead terminals in the first column may be arranged with the sequence of "first terminal P1, first terminal P1", and the next two lead terminals in the second column may be arranged with the sequence of "first terminal P1, the second terminal P2", and the next four lead terminals in the third column and the fourth column may also be arranged with the same sequence as the first four lead terminals. It should be understand for those skilled in the art that the remaining lead terminals can be arranged continuously according to the above-described rule although not illustrated in the drawings. It can be seen in FIG. 6 that the leads L corresponding to the data signal lines Dx and the leads L of the corresponding touch signal lines Tx can also be prepared and wired in a same layer without intersecting each other by means of such a mixture arrangement of the first terminals P1 corresponding to the data lines Dx and the second terminals P2 corresponding to the touch signal lines Tx (as illustrated in FIG. 9).

It should be understood for those skilled in the art that the manner that the first terminals and the second terminals are provided in a row direction or a column direction so as to be consistent with the sequence in which the data lines connected to the first terminals and the touch signal lines connected to the second terminals are arranged may have various embodiments other than the above examples, and embodiments of the present disclosure do not limit the number of lead terminals in each row or column.

The first terminals and the second terminals are provided in a row direction or a column direction so as to be consistent with the sequence in which the data lines connected to the first terminals and the touch signal lines connected to the second terminals are arranged, and the touch display panel according to an embodiment of the present disclosure does not need to additionally incorporate a layer of metal and a corresponding manufacturing process to separately manufacture the leads corresponding to the touch signal lines, thereby reducing manufacturing costs. In addition, the problems caused by extra added metal wirings and the large space occupied by the wirings can be eliminated so as to improve the product yield.

Figure 7:
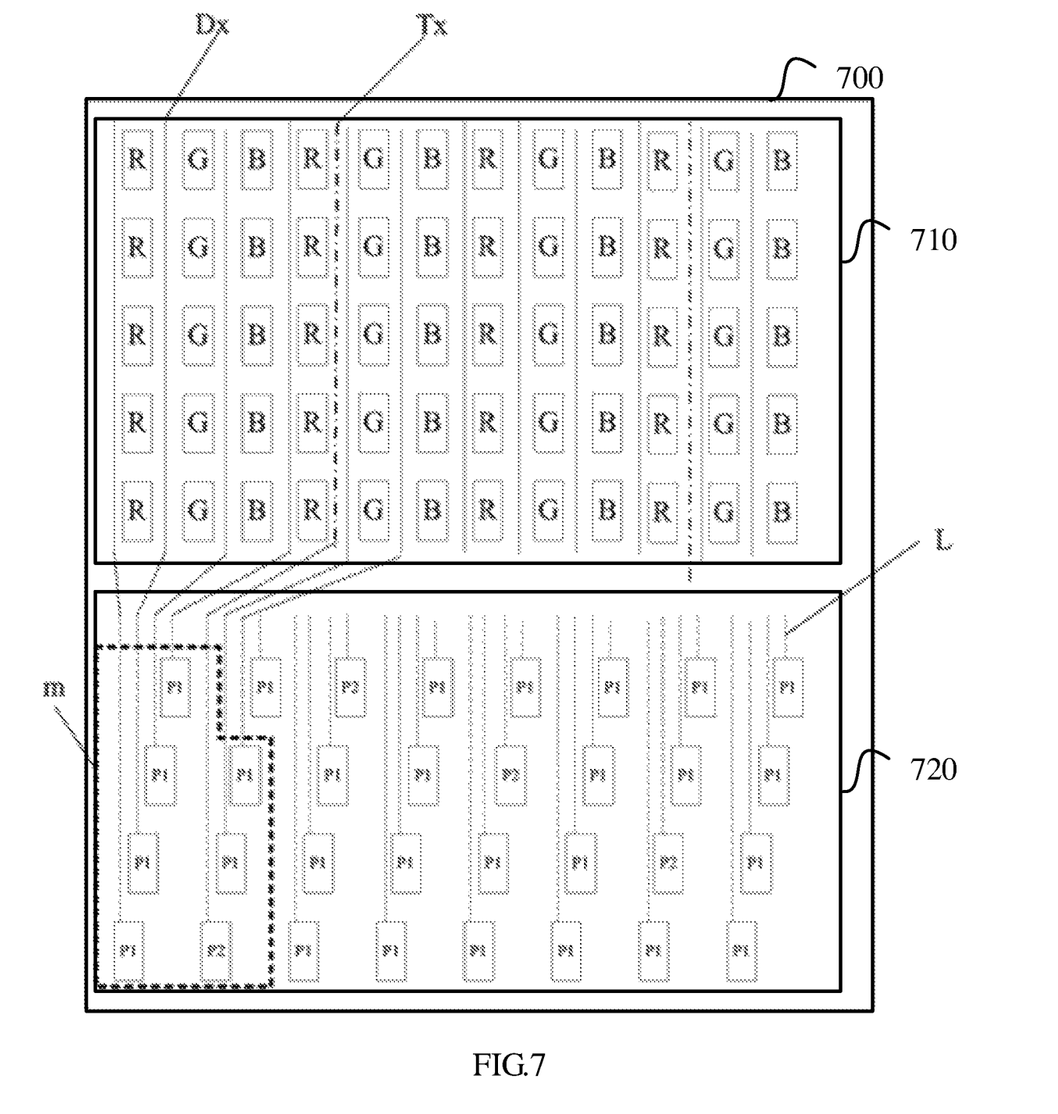
FIG. 7 is a schematic diagram of a touch display panel according to another embodiment of the present disclosure.

FIG. 7 illustrates a schematic diagram of a touch display panel 700 according to another embodiment of the present disclosure. Different from the above embodiment, in the touch display panel as illustrated in FIG. 7, two adjacent rows of the lead terminals shift from each other by a predetermined distance in the row direction. For example, the predetermined distance is a half of the width of each of the lead terminals. The gaps between adjacent columns of the lead terminals can be used to for wirings and leads to connect the lead terminals to the data lines and the touch signal lines with shorter leads, thereby simplifying the manufacturing process and reducing production cost. It should be understood for those skilled in the art that the predetermined distance of the adjacent two rows of lead terminals shifted from each other in the row direction may also have other value(s) than a half of the width of the lead terminals.

The touch display panel provided by an embodiment of the present disclosure may comprise a plurality of columns of pixels. Each pixel comprises sub-pixels of three colors of red R, green G, and blue B. Each column of sub-pixels corresponds to one data line Dx and corresponds to one first terminal P1 as well. An example of arranging the first terminals and the second terminals with respect to the position of the touch signal lines Tx in the display area between the sub-pixels will be described below with reference to FIGS. 7 and 8.

In the touch display panel as illustrated in FIG. 7, one touch signal line Tx is arranged in every two columns of pixels, that is, one touch signal line Tx is provided for every six data lines Dx. More specifically, the touch signal line Tx is disposed between the red sub-pixels of the second column of pixels and the green sub-pixels of the second column of pixels in the every two columns of pixels. The first terminals P1 and the second terminals P2 are provided in the column direction so as to be consistent with the sequence in which the data lines connected to the first terminals and the touch signal lines connected to the second terminals are arranged, so as to avoid crossing of the leads connected to the data lines Dx and the leads connected to the touch signal lines Tx. In the example as illustrated in FIG. 7, from the leftmost first terminal P1, every seven lead terminals may be selected as one lead terminal group m in the order from the outermost lead terminal to the innermost lead terminal of each column. Each lead terminal group m comprises six first terminals P1 and one second terminal P2, and the fifth lead terminal of each lead terminal group m is the second terminal P2. The leads L corresponding to the lead terminals can be disposed in a same layer by mixing arrangement of the first terminals P1 and the second terminals P2. In this way, it is not necessary for avoiding the leads from intersecting each other to additionally incorporate a layer of metal and a corresponding manufacturing process to separately manufacture the leads corresponding to the touch signal lines Tx. In addition, it is also conducive to alleviate the problem of RG color crosstalk defect that the touch signal lines Tx are disposed between the R sub-pixels and the G sub-pixels.

Figure 8:
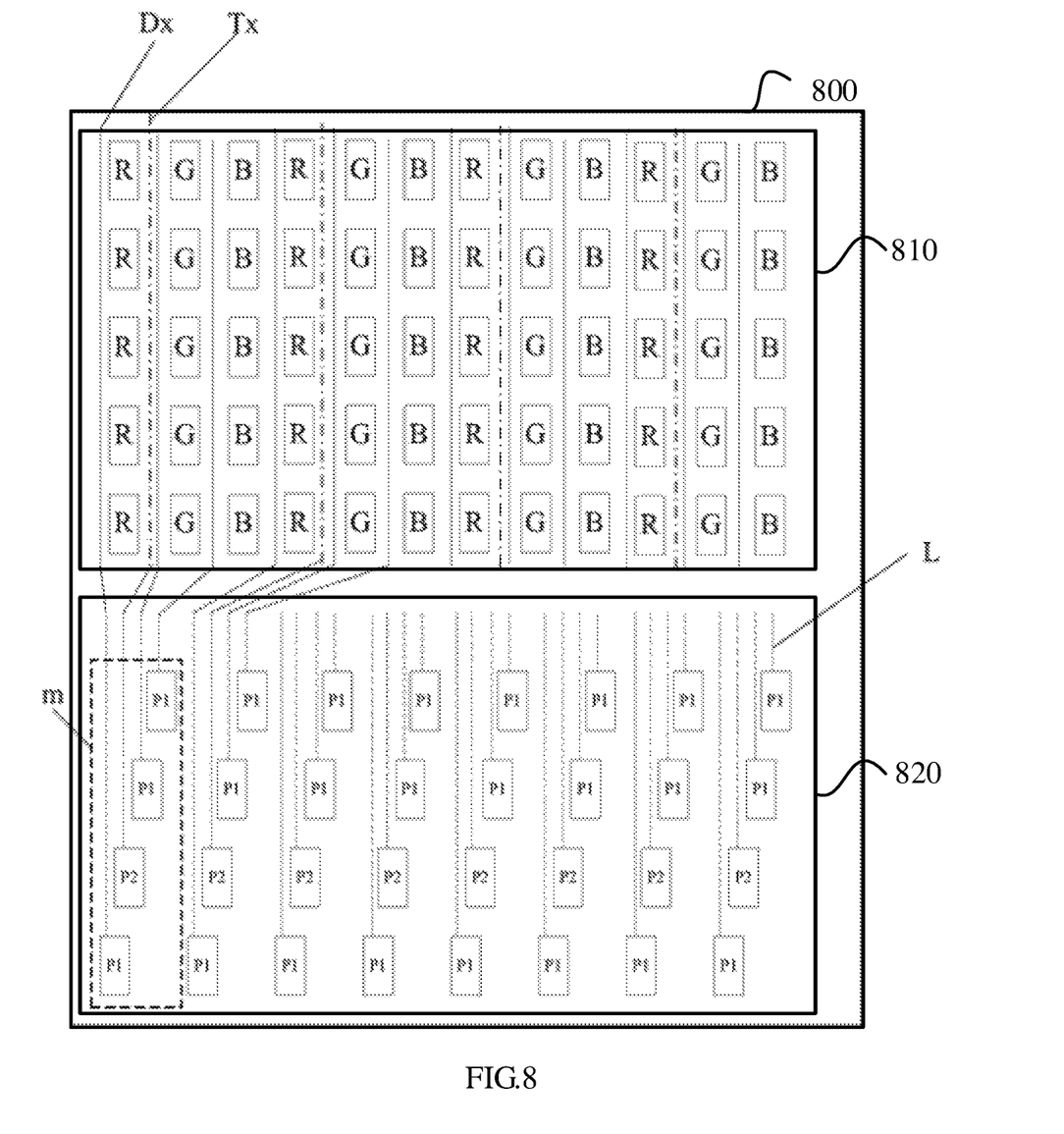
FIG. 8 is a schematic diagram of a touch display panel according to another embodiment of the present disclosure.

FIG. 8 illustrates a schematic diagram of a touch display panel 800 according to another embodiment of the present disclosure. Different from the embodiment as illustrated in FIG. 7, in the touch display panel as illustrated in FIG. 8, one touch signal line Tx is arranged in each column of pixels, that is, one touch signal line Tx is provided for every three data lines Dx. More specifically, the touch signal lines Tx is disposed between the red sub-pixels and the green sub-pixels in each column of pixels. The first terminals P1 and the second terminals P2 are provided in the column direction so as to be consistent with the sequence in which the data lines connected to the first terminals and the touch signal lines connected to the second terminals are arranged, so as to avoid crossing of the leads connected to the data lines Dx and the leads connected to the touch signal lines Tx. In the example as illustrated in FIG. 8, from the leftmost first terminal P1, every four lead terminals may be selected as one lead terminal group m in the order from the outermost lead terminal to the innermost lead terminal of each column. Each lead terminal group m comprises three first terminals P1 and one second terminal P2, and the second lead terminals of each lead terminal group m is the second terminals P2. The leads L corresponding to the lead terminals can be disposed in a same layer by mixing arrangement of the first terminals P1 and the second terminals P2. In this way, it is not necessary for avoiding the leads from intersecting each other to additionally incorporate a layer of metal and a corresponding manufacturing process to separately manufacture the leads corresponding to the touch signal lines Tx. In addition, it is also conducive to alleviate the problem of RG color crosstalk defect that the touch signal lines Tx are disposed between the R sub-pixels and the G sub-pixels.

It should be noted that, the above various arrangements of the touch signal lines and the lead terminals are merely examples, and in practical applications, the positions of the touch signal lines and the mixed arrangement of terminals P1 and second terminals P2 may be adjusted according to the resolution and size of the touch display panel. It should be noted that the mixed arrangement of the first terminals P1 and the second terminals P2 needs to match the design of the touch signal lines Tx in the display area.

In an embodiment of the present disclosure, the data lines and the touch signal lines are provided in a same layer and insulated from each other. Specifically, in the above touch display panel provided by an embodiment of the present disclosure, a common electrode layer may be segmented and reused as touch electrodes. The data lines and the touch signal lines can be formed by the same step of the patterning process, that is, the data lines and the touch signal lines are disposed in a same layer, so as to simplify the manufacturing process and reduce production cost. In an alternative embodiment, the data lines and the touch signal lines may also be disposed in different layers, which is not limited herein.

Figure 10:
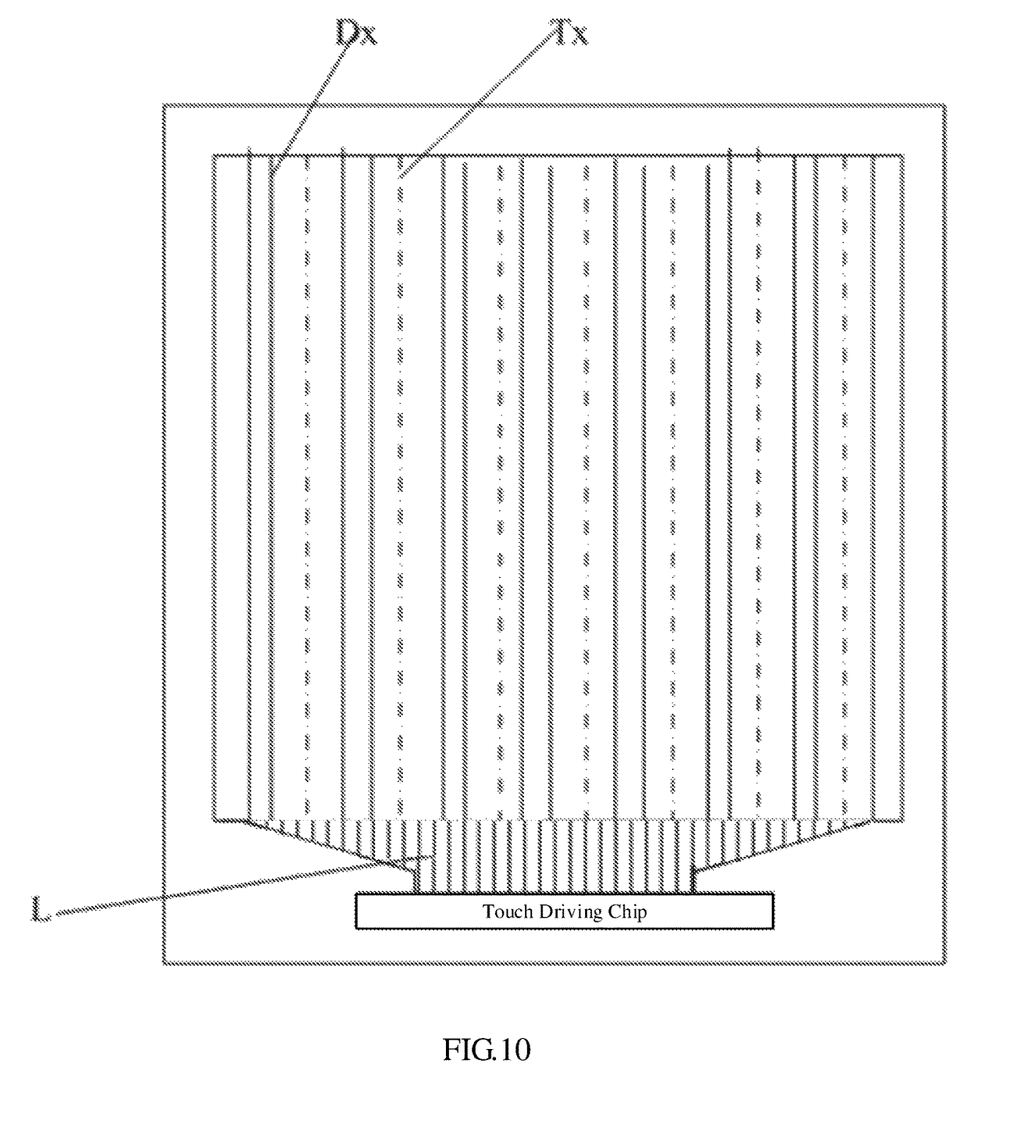
FIG. 10 is a schematic diagram of the structural of a display device according to an embodiment of the present disclosure.

Based on the same disclosed concept, a display device is provided by an embodiment of the present disclosure. As illustrated in FIG. 10, the display device comprises any one of touch display panels provided by the embodiments of the present disclosure. In the display device, the arrangement of the touch signal lines Tx and the data lines Dx may be adjusted according to actual needs. In FIG. 10, an example in which one touch signal line Tx is disposed between two data lines Dx will be described. All the leads L to the touch driving chip correspond to all the touch signal lines Tx and the data lines Dx.

The display device can be any product or component having a display function which may be a mobile phone, a tablet, a television, a display, a laptop, a digital photo frame, a wearable device or a navigator and the like. Because the principle of the display device operation is similar to the principle of the touch display panel, the implementation of the display device may refer to the implementation of the touch display panel, and details are not repeatedly described herein.

Obviously, those skilled in the art can make various modifications and variations to the present disclosure without departing from the spirit and scope of the disclosure. In this way, if these modifications and variations of the disclosure fall within the scope of the claims of the disclosure and the equivalents thereof, the disclosure is also intended to include these modifications and variations.

Further aspects and scope of the adaptability become apparent in the description provided herein. It should be understood that aspects of the present application may be implemented alone or in combination with one or more other aspects. It is also to be understood that the description and specific examples herein are merely intended to illustrate the purposes and not intended to limit the scope of the application.

Unless the context clearly indicates otherwise, the singular form of a phrase as used herein and in the attached claims include the plural form thereof, and vice versa. Thus, it is common to include the plural form of the corresponding term when referring to a singular form. Similarly, the terms "comprise," "comprising," "include," "including," etc., are to be construed as being inclusive and not exclusive. Similarly, the terms "comprise" and "or" should be construed as inclusive unless definitely prohibited herein. Where the term "example" is used herein, and particularly when it is located after a group of terms, the "example" is merely exemplary and illustrative and should not be considered as exclusive or extensive.

The foregoing description of the embodiments has been provided for the purposes of the above illustration and description. It is not intended to be exhaustive or to limit the application. The various elements or features of a particular embodiment are generally not limited to a particular embodiment, but these elements and features are interchangeable and may be used in the selected embodiments when it is appropriate, even if not specifically illustrated or described. It can be changed in many ways, similarly. Such variations are not to be regarded as departing from the present application, and all such modifications are intended to be included within the scope of this application.

What is claimed is:

1. A touch display panel, comprising: a plurality of touch signal lines and a plurality of data lines disposed in a display area, and a plurality of lead terminals disposed in a peripheral area,
    wherein the plurality of lead terminals comprises a plurality of first terminals respectively connected to the plurality of data lines and a plurality of second terminals respectively connected to the plurality of touch signal lines;
    the plurality of lead terminals are arranged in a matrix, the plurality of first terminals and the plurality of second terminals are provided in a row direction or a column direction so as to be consistent with a sequence in which the data lines connected to the first terminals and the touch signal lines connected to the second terminals are arranged; and
    wherein two adjacent rows of the lead terminals shift from each other by a predetermined distance in the row direction, wherein the predetermined distance is a half of a width of each of the lead terminals.

2. The touch display panel according to claim 1, wherein the display area comprises a plurality of columns of pixels, and one touch signal line is disposed in every two columns of pixels.

3. The touch display panel according to claim 2, wherein the pixels comprise red sub-pixels, green sub-pixels, and blue sub-pixels, and the touch signal lines are disposed between the red sub-pixels and the green sub-pixels.

4. The touch display panel according to claim 1, wherein the display area comprises a plurality of columns of pixels, and one touch signal line is disposed for each column of pixels.

5. The touch display panel according to claim 4, wherein the pixels comprise red sub-pixels, green sub-pixels, and blue sub-pixels, and the touch signal lines are disposed between the red sub-pixels and the green sub-pixels.

6. The touch display panel according to claim 1, wherein the data lines and the touch signal lines are provided in a same layer and insulated from each other.

7. A display device, comprising the touch display panel according to claim 1.

8. A touch display panel, comprising: a plurality of touch signal lines and a plurality of data lines disposed in a display area, and a plurality of lead terminals disposed in a peripheral area,
wherein the plurality of lead terminals comprises a plurality of first terminals respectively connected to the plurality of data lines and a plurality of second terminals respectively connected to the plurality of touch signal lines;
the plurality of lead terminals are arranged in a matrix, the plurality of first terminals and the plurality of second terminals are provided in a row direction or a column direction so as to be consistent with a sequence in which the data lines connected to the first terminals and the touch signal lines connected to the second terminals are arranged;
wherein the display area comprises a plurality of columns of pixels, and one touch signal line is disposed for each column of pixels; and
wherein the pixels comprise red sub-pixels, green sub-pixels, and blue sub-pixels, and the touch signal lines are disposed between the red sub-pixels and the green sub-pixels.

* * * * *